United States Patent [19]

Anderson et al.

[11] Patent Number: 5,290,338
[45] Date of Patent: Mar. 1, 1994

[54] ANTIMONY SEPARATION PROCESS

[75] Inventors: Corby G. Anderson, Silverton; Suzzann M. Nordwick, Wallace; Leo E. Krys, Kellogg, all of Id.

[73] Assignee: Sunshine Mining Company, Kellogg, Id.

[21] Appl. No.: 962,899

[22] Filed: Oct. 16, 1992

[51] Int. Cl.$^5$ ............................................. C01B 27/00
[52] U.S. Cl. ...................................... 75/703; 75/724; 423/87
[58] Field of Search .................... 75/724, 703; 423/87

[56] References Cited

U.S. PATENT DOCUMENTS

| | | | |
|---|---|---|---|
| 975,148 | 11/1910 | Masson | 75/724 |
| 2,331,395 | 10/1943 | Holmes | 204/105 |
| 3,709,680 | 1/1973 | Holmes et al. | 75/101 R |
| 3,860,523 | 1/1975 | Petrow et al. | 252/8.1 |
| 3,911,078 | 10/1975 | Nadkarni et al. | 423/87 |
| 3,930,969 | 1/1976 | Chen | 204/105 R |
| 3,960,989 | 6/1976 | Petrow et al. | 260/884 |
| 3,969,202 | 7/1976 | Albrethsen et al. | 204/105 R |
| 3,986,943 | 10/1976 | Lamb | 204/105 R |
| 4,005,176 | 1/1977 | Fernschild et al. | 423/87 |
| 4,051,220 | 9/1977 | Coltrinari | 423/87 |
| 4,096,232 | 6/1978 | Vogt | 423/87 |
| 4,110,247 | 8/1978 | Gower et al. | 252/313 |
| 4,169,104 | 9/1979 | Burt et al. | 260/438.1 |
| 4,218,425 | 8/1980 | Charlton et al. | 260/438.1 |
| 4,225,571 | 9/1980 | de Denus | 423/561 A |
| 4,272,339 | 6/1981 | Knight et al. | 204/106 |
| 4,341,655 | 7/1982 | Richardson | 252/313 |
| 4,351,741 | 9/1982 | Vogt | 252/313 |
| 4,722,774 | 2/1988 | Hyatt | 204/123 |
| 4,741,865 | 5/1988 | Kintz et al. | 252/609 |

OTHER PUBLICATIONS

J. A. De Keyser and W. E. Jespers, The Harris Refinery of S. A. Metallurgie Hoboken-Overpelt N.V., TMS Paper Selection A81-10, The Metallurgical Society of AIME, 1981.

R. M. Nadkarni and C. L. Kusik, Hydrometallurgical Removal of Arsenic From Copper Concentrates, Arsenic Metallurgy Fundamentals and Applications, Proceedings of a Symposium Sponsored by the TMS-AIME Physical Chemistry Committee, Jan. 25-29, 1988.

Z. Tian-cong, *The Metallurgy of Antimony*, Central South University Press, Changsa, The People's Republic of China 1988, pp. 548-549.

Primary Examiner—Peter D. Rosenberg
Attorney, Agent, or Firm—Randall C. Brown; Mark A. Rogers

[57] ABSTRACT

An antimony recovery process is disclosed in which antimony-containing material is leached in a solvent including elemental sulfur and a caustic to preferentially leach antimony. The antimony-containing leach liquor from the leaching step is separated from the insoluble residue by filtration, and the antimony compounds in the separated leach liquor are crystallized to separate the antimony compounds from impurities which are left in solution in the leach liquor. The crystals are then redissolved and treated to create marketable antimony products of high purity, such as antimony metal, sodium hydroxy antimonate, sodium antimonate, antimony pentoxide, and antimony pentasulfide. Alternatively, the crystallized antimony compounds comprising primarily sodium thioantimonate crystals may be recovered and sold without further treatment. Waste products may be treated with soluble iron compounds and lime to render the waste products safe for disposal. Additionally, feed material having a high weight ratio of soluble arsenic to soluble antimony may be pretreated, if desired, to improve the purity of the recovered antimony products and to remove the arsenic for further treatment or disposal.

22 Claims, 4 Drawing Sheets

ANTIMONY SEPARATION PROCESS

BACKGROUND OF THE INVENTION

This invention relates to the recovery of antimony from antimony-containing materials, particularly ores, ore concentrates, smelter flue dusts, metals or the like. This invention also relates to the safe treatment of such materials which contain antimony and arsenic.

Several types of ore and similar materials contain significant amounts of antimony and arsenic. In refining metals from the various ores, it is desirable to separate the antimony and arsenic from the target metals. Many antimony products are also marketable, so it is desirable to recover these antimony compounds in as pure a form as commercially reasonable. Additionally, arsenic-containing products and waste products resulting from these separation processes must be treated with care to minimize pollution control problems. In that regard, it is often desirable to separate arsenic and arsenic-containing compounds from these materials in stable forms that may be conveniently, economically, and safely disposed.

Certain prior art methods have been proposed and used for separating antimony and arsenic from materials such as ores and ore concentrates. The most prevalent prior art method involves a pyrometallurgical process known as liquation in which ores containing antimony in the form of stibnite are heated to above the melting point of stibnite. This temperature is very low relative to the melting points of the other metal sulfides which are contained in the ore. The stibnite melts and "drains" preferentially from the rest of the ore and can then be collected. Similarly, antimony oxide production by oxidative roasting is common. These prior art processes suffer greatly from their inability to effectively separate impurities from the final antimony products.

In addition, certain prior art hydrometallurgical processes have been proposed or developed to avoid pollution control problems arising from the use of such smelting processes. Nonetheless, such prior art hydrometallurgical processes suffer from various shortcomings, particularly with respect to the leaching of the ore or other material and with respect to the purity of the antimony products obtained. For example, in leaching stages of these prior art processes, undesirably high percentages of antimony can be left in the insoluble leach residue. Also, expensive solvents or reagents are used which are not easily regenerated or recycled.

Antimony is often present in the material to be treated in both its +3 (trivalent) and +5 (pentavalent) valence states. It is desirable during leaching to obtain an antimony product in its +5 state rather than its +3 state (i.e., as sodium thioantimonate rather than sodium thioantimonite). This is because the crystallization qualities of antimony in its +5 valence state are greatly enhanced compared to the crystallization qualities of antimony in its +3 state.

Some solvents may perform acceptably when used in connection with ores containing antimony in its pentavalent form but perform inadequately when antimony is present in its trivalent form. Additionally, prior art processes for treating materials including antimony in its trivalent form often require two stage leaching. This adds to the cost and complexity of the processes and disadvantageously results in a diminished percentage recovery of antimony. Also, antimony products produced using such prior art processes are of relatively low purity, and the contained impurities impair the commercial value of the antimony products.

Finally, it has been discovered that smelter flue dust often contains excessive amounts of arsenic and antimony making the flue dust a hazardous waste. As such, disposal of the flue dust must be handled with great care and at great expense. Such flue dusts also may contain valuable constituents such as Cu, Cd, Ga, Te, Sn, Ge, Zn, Pb, In, Ag, Au, and platinum group metals.

SUMMARY OF THE INVENTION

It is therefore an object of the present invention to provide an antimony separation process which results in a high percent recovery of high purity antimony products.

It is another object of the present invention to provide an antimony separation process including a leaching stage in which the components of the leaching solvent may be regenerated and recycled.

It is a further object of the present invention to provide an antimony separation process in which the antimony is leached from the material to be treated in a single leaching stage regardless of the valency state of the antimony to be leached.

It is a still further object of the present invention to provide an antimony separation process which may be used to recover marketable components from hazardous waste material containing arsenic and antimony.

It is a still further object of the present invention to provide an antimony separation process which may be used to render hazardous waste material that once contained arsenic and antimony safe for disposal.

Toward the fulfillment of these and other objects, the antimony separation process of the present invention involves the separation of antimony from antimony-containing materials. The antimony-containing material is leached in a solvent, or leach liquor, including elemental sulfur, sodium sulfide, sodium thiosulfate, and a caustic material, such as sodium hydroxide, to preferentially dissolve antimony. The leach liquor may also include sodium hydrosulfide. The antimony-containing pregnant leach liquor is separated from the insoluble residue by filtration. The antimony compounds in the clarified, pregnant leach liquor are crystallized and separated from impurities which are left in solution in the leach liquor. The crystallized antimony compounds are then redissolved in water or a solution of water and sodium hydroxide and treated in various ways to create marketable antimony products of high purity, such as antimony metal, sodium hydroxy antimonate, sodium antimonate, antimony pentoxide, and antimony pentasulfide. Alternatively, the crystallized antimony compounds may be sold as sodium thioantimonate without the need to redissolve the crystallized antimony compounds for further treatment. Waste products, which may include arsenic, can be treated with soluble iron compounds and lime to render the waste products safe for disposal. Antimony-containing feed material having a high weight ratio of soluble arsenic to soluble antimony may be pretreated, if desired, to improve the purity of the recovered antimony products and to remove the arsenic for further treatment or disposal.

BRIEF DESCRIPTION OF THE DRAWINGS

The above brief description as well as further objects, features, and advantages of the present invention will be more fully appreciated by reference to the following detailed description of the presently preferred but nonetheless illustrative embodiments of the present invention when taken in conjunction with the accompanying drawings wherein.

DESCRIPTION OF THE PREFERRED EMBODIMENT

The present invention involves the extraction of antimony from ore concentrates, ores, flue dust, oxides, metals or similar antimony containing material. A preferred embodiment of the invention involves the extraction of antimony from antimony ore such as tetrahedrite and stibnite or other mixed metal sulfides. Arsenic ores such as tennantite, orpiment, and enargite, arsenic- and antimony-containing flue dusts, and other antimony-containing materials which have significant amounts of arsenic may also be treated in accordance with the present process, especially when such materials are pretreated, as will be discussed below.

Figure 1:
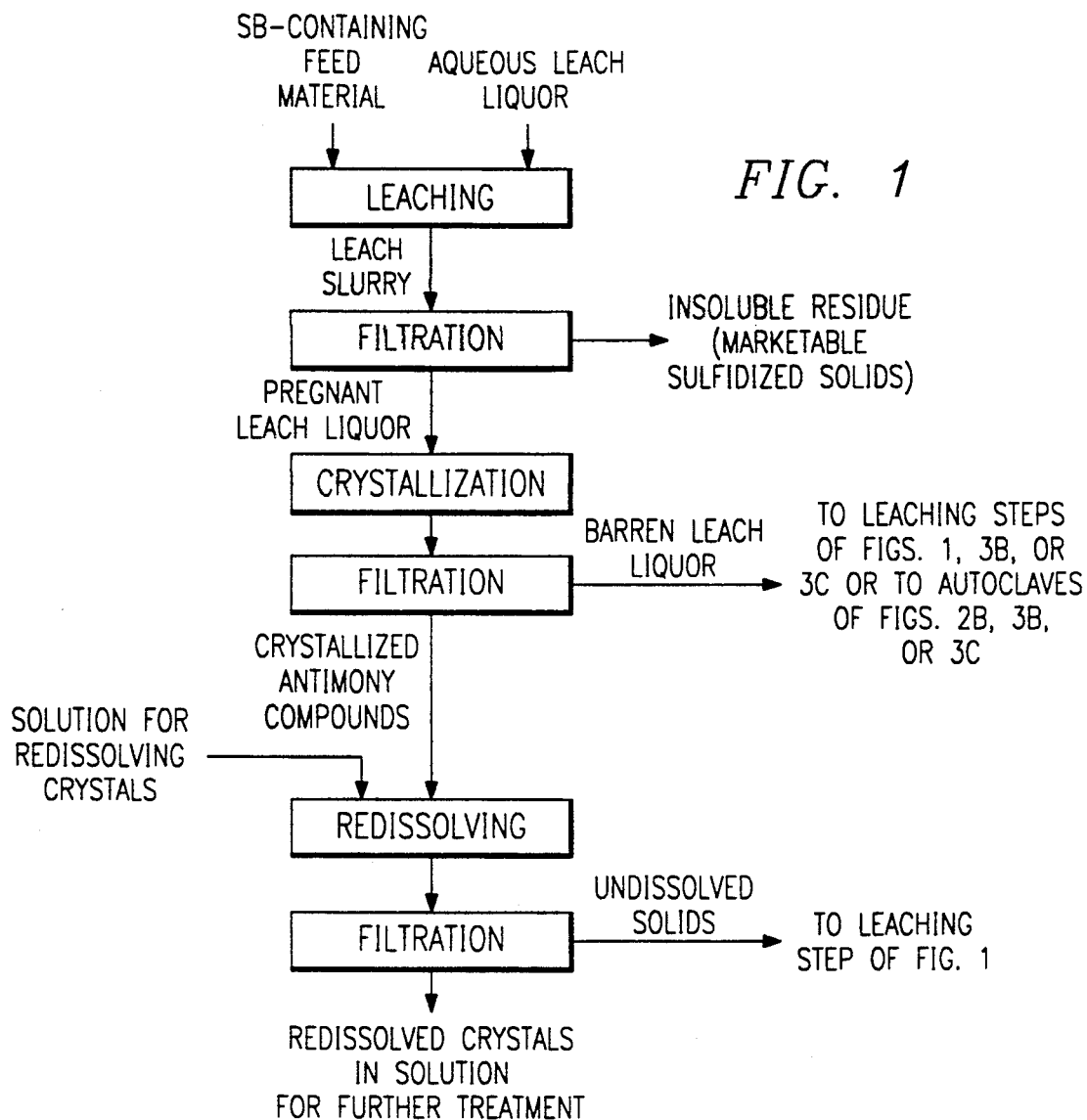
FIG. 1 is a flow diagram of a process of the present invention involving treatment of antimony-containing material to obtain crystallized antimony compounds for marketing or further treatment.
Figure 2A:
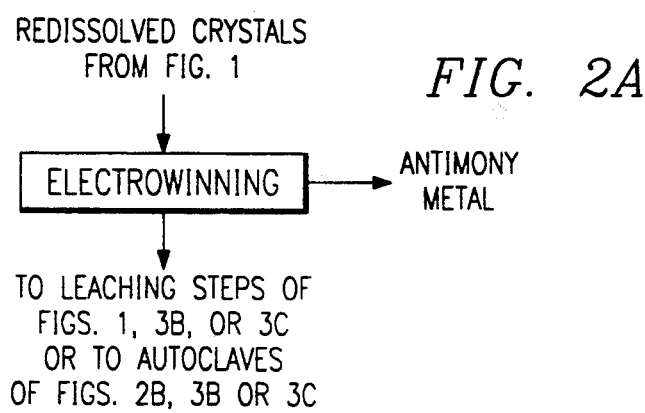
FIG. 2A is a flow diagram of a process of the present invention for obtaining antimony metal from redissolved crystallized antimony compounds obtained from the process of FIG. 1.

Referring to the flow diagram of FIG. 1 of the drawings, a leaching process is performed on the antimony-containing feed material to remove antimony. The antimony-containing feed material is leached using a leach liquor which includes elemental sulfur, sodium sulfide, sodium hydrosulfide, sodium thiosulfate, and sodium hydroxide. The leach slurry formed is then filtered to remove insoluble residue and leave a clarified, pregnant leach liquor. If necessary, solubilized precious metals are precipitated from solution by cementation, absorption, pH adjustment, or other methods commonly practiced by those of ordinary skill in the art. Antimony is separated from the clarified, pregnant leach liquor by cooling. The clarified, pregnant leach liquor is cooled to a temperature at which the soluble antimony compounds (primarily sodium thioantimonates) crystallize and precipitate out of solution while a number of impurities are left in the solution. The crystallized antimony compounds are separated from the barren leach liquor by filtration and may be sold as is or redissolved in water or a solution of water and NaOH for further treatment. The redissolved crystals are treated in various ways (FIGS. 2A-2D) to produce antimony products of high purity. Some of these products include sodium thioantimonate, antimony metal, sodium hydroxy antimonate, sodium antimonate, antimony pentoxide, and antimony pentasulfide. As will be discussed in more detail below, the antimony-containing feed material may be pretreated if desired (FIGS. 3A-3C).

To produce antimony products of high quality and high purity it is preferable to begin the process with a large degree of separation of impurities from antimony in the leaching step. Example 1A, below, illustrates a baseline leach test for materials having a low weight ratio of soluble As to soluble Sb materials. Tests were conducted to illustrate the effects on leaching of temperature, thiosulfate concentration, sodium hydroxide concentration, and polysulfide concentration (Examples 1B-1E). Also, a test was performed to illustrate the effect of using a leach liquor obtained by combining elemental sulfur with sodium hydroxide (Example 1F). Examples 1A-1F are set forth below. Additionally, the benefits of recycling sodium hydroxy antimonate to the leaching step will be illustrated.

EXAMPLE 1A

Standard Baseline Leach

An aqueous leach liquor is prepared by adding 1600 grams of hydrated dry sodium sulfide flake to 2 liters of water. To this are added 71 grams of NaOH and 216 grams of $Na_2CO_3$. Water is added to the mixture to bring the volume of the mixture up to 4 liters. The mixture is then heated to dissolve the solids and form an alkaline sodium sulfide solution assaying as $OH^-=7.2$ g/L, $S^{-2}=100.0$ g/L, $CO_3=31.08$ g/L. The mixture is then put in a 2 gallon stainless steel agitated leach vessel. This device has automatic temperature and agitation control. The mixture is heated to 105° C., which is the boiling point of the mixture. To this mixture, solids containing antimony, such as antimony-containing tetrahedrite concentration, are added and tested for dissolution. A sample of antimony-containing tetrahedrite concentrate was assayed as follows: Sb=19.94%, As=1.57%, Pb=1.24% and total sulfur=26.0%. The soluble arsenic to soluble antimony weight ratio in this material is approximately 0.08, therefore, for reasons discussed below, it is considered to have a low weight rato of soluble arsenic to soluble antimony.

For the described test, 784 grams of the antimony-containing tetrahedrite concentrate material was added to the 105° C. alkaline sodium sulfide solution. The resulting slurry was constantly agitated at 1000 rpm and leached for 5 hours. During this operation, samples of the leach slurry were taken at timed intervals for analysis of reaction kinetics. After 5 hours of reaction, the leach vessel was cooled and drained. Remaining solids were removed from the liquid by filtration. A mass balance was performed by analyzing the solids and liquids. In this test, 80.38% of the Sb and 48.5% of the As were solubilized.

EXAMPLE 1B

Effect of Temperature on Leaching

This example illustrates the effect temperature has on the baseline leaching of Example 1A. To obtain temperatures above the atmospheric boiling point of the leach slurry, an enclosed pressure vessel was used.

The tests were conducted under conditions substantially identical to the conditions of Example 1A, however, each test was conducted at a different temperature. Again, samples of the leach slurry were taken at timed intervals for analysis of reaction kinetics. The results of these tests are summarized in Table 1B, below. As can be seen, higher temperatures gave more rapid antimony dissolution and higher antimony recoveries.

TABLE 1B

Effect of Temperature on Leaching

Percent Recovery of Sb

| Time (hrs.) | Run 1 (60° C.) | Run 2 (80° C.) | Run 3 (95° C.) | Run 4 (105° C.) | Run 5 (120° C.) | Run 6 (140° C.) | Run 7 (160° C.) |
|---|---|---|---|---|---|---|---|
| 0.0 | 0 | 0 | 0 | 0 | 0 | 0 | 0 |
| 0.17 | 9.82 | 23.30 | 37.40 | 43.31 | 51.02 | 67.81 | — |
| 0.50 | 13.70 | 32.30 | 45.20 | 50.78 | 61.31 | 84.98 | 92.24 |
| 1.0 | 17.60 | 42.20 | 55.10 | 54.78 | 75.10 | 91.58 | 94.64 |
| 2.0 | 24.50 | 51.30 | 63.00 | 66.54 | 91.26 | — | 93.03 |
| 5.0 | 35.60 | 65.70 | 75.40 | 80.38 | 93.83 | 97.16 | 96.93 |

EXAMPLE 1C

Effect of Thiosulfate Concentration on Leaching

This example illustrates the effect of thiosulfate concentration has on leaching.

The tests were conducted under conditions substantially identical to the conditions of Example 1A, however, in each test different amounts of reagent grade sodium thiosulfate, $Na_2S_2O_3$, were added to the leach solution prior to the addition of antimony-containing tetrahedrite concentrate solids. Thus, this test is illustrative of one step oxidation of +3 Sb to +5 Sb. Again, samples of the leach slurry were taken at timed intervals for analysis of reaction kinetics. The results of these tests are summarized in Table 1C, below. As can be seen, usage of thiosulfate gave more rapid antimony dissolution and higher antimony recoveries.

TABLE 1C

Effect of $S_2O_3$ Concentration on Leaching

Percent Recovery of Sb

| Time (hrs.) | Run 1 (0 g/L $S_2O_3$) | Run 2 (25 g/L $S_2O_3$) | Run 3 (50 g/L $S_2O_3$) | Run 4 (100 g/L $S_2O_3$) |
|---|---|---|---|---|
| 0.0 | 0 | 0 | 0 | 0 |
| 0.17 | 43.31 | 53.00 | 51.63 | 63.69 |
| 0.50 | 50.98 | 60.77 | 61.26 | 75.94 |
| 1.0 | 54.78 | 70.74 | 72.14 | 88.54 |
| 2.0 | 66.54 | 80.42 | 82.93 | 94.66 |
| 5.0 | 80.38 | 88.46 | 91.65 | 95.26 |

EXAMPLE 1D

Effect of NaOH Concentration on Leaching

This example illustrates the effect of NaOH concentration on leaching.

The tests were conducted under conditions substantially identical to the conditions of Example 1A, however, in each test a different amount of NaOH was added to the initial leach solution. Again, samples of the leach slurry were taken at timed intervals for analysis of reaction kinetics. The results of these tests are summarized in Table 1D, below. As can be seen, the addition of more NaOH tended to give more rapid antimony dissolution and higher antimony recoveries.

TABLE 1D

Effect of NaOH Concentration on Leaching

Percent Recovery of Sb

| Time (hrs.) | Run 1 (0 g/L OH) | Run 2 (7.2 g/L OH) | Run 3 (21.3 g/L OH) | Run 4 (36.35 g/L OH) |
|---|---|---|---|---|
| 0.0 | 0 | 0 | 0 | 0 |
| 0.17 | 30.24 | 43.31 | 47.81 | 52.62 |

TABLE 1D-continued

Effect of NaOH Concentration on Leaching

Percent Recovery of Sb

| Time (hrs.) | Run 1 (0 g/L OH) | Run 2 (7.2 g/L OH) | Run 3 (21.3 g/L OH) | Run 4 (36.35 g/L OH) |
|---|---|---|---|---|
| 0.5 | 44.35 | 50.78 | 60.59 | 64.11 |
| 1.0 | 57.0 | 54.78 | 66.91 | 75.94 |
| 2.0 | 64.52 | 66.54 | 77.94 | 79.08 |
| 5.0 | 71.51 | 80.38 | 85.51 | 89.43 |

EXAMPLE 1E

Effect of Polysulfide Concentration on Leaching

This example illustrates the effect of polysulfide concentration on the baseline leach. Polysulfide (in this case sodium tetrasulfide, $Na_2S_4$) is produced by replacing some of the sulfide ion in the baseline leach with elemental sulfur. Thus, this test is also illustrative of one step oxidation of +3 Sb to +5 Sb.

The tests were conducted under conditions substantially identical to the conditions of Example 1A, however, in each test a different amount of sodium tetrasulfide was added to replace sodium sulfide in the leach solution. Total solution sulfur concentration was kept at the baseline condition of 100 g/L. Again, samples of the leach slurry were taken at timed intervals for analysis of reaction kinetics. The results of these tests are summarized in Table 1E below. As can be seen, low levels of sulfur addition improved leach rates and recoveries. However, the use of excess sulfur actually decreased rates and recoveries. At the higher levels, the sulfur (polysulfide) in the leach liquor appeared to rapidly consume the hydroxide ion in the leach liquor thereby forming HS. This would lower the capability of the solution to leach effectively. Nonetheless, the addition of extra NaOH when adding high levels of polysulfide to the solution allowed increased reaction rates and recoveries to occur.

TABLE 1E

Effect of Polysulfide Concentration on Leaching

Percent Recovery of Sb

| Time | Run 1 (0% $S_x$) | Run 2 (10% $S_x$) | Run 3 (20% $S_x$) | Run 4 (30% $S_x$) | Run 5 (40% $S_x$) | Run 6 (60% $S_x$) |
|---|---|---|---|---|---|---|
| 0.0 | 0 | 0 | 0 | 0 | 0 | 0 |
| 0.17 | 43.31 | 48.86 | 30.36 | 10.49 | 16.35 | 9.47 |
| 0.5 | 50.98 | 42.44 | 45.68 | 34.13 | 22.79 | 13.84 |
| 1.0 | 54.78 | 72.87 | 58.10 | 49.88 | 33.96 | 17.51 |
| 2.0 | 66.54 | 78.40 | 74.37 | 66.40 | 45.03 | 20.65 |
| 5.0 | 80.38 | 83.86 | 92.83 | 82.79 | 65.26 | 30.19 |

EXAMPLE 1F

Use of Elemental Sulfur and Caustic as Leach Liquor

The test below illustrates the effect of the use of elemental sulfur and a caustic in one step leaching.

In this test, solids of the type treated in Example 1A were leached in a mixture of elemental sulfur dissolved in NaOH. All other parameters were substantially the same as indicated in the baseline leach tests outlined in Example 1A. To make the solution, 400 grams of sulfur were dissolved in 1100 grams of NaOH and water. Water was then added to bring the volume of the solution up to 4 liters. To this solution, 216 grams of soda ash, $Na_2CO_3$, were added and dissolved. When the test was completed 88.48% of the antimony was recovered in 5 hours.

According to the present invention, the antimony-containing feed material is leached in a one stage leach using a leach liquor prepared by dissolving elemental sulfur in a caustic material such as NaOH. If desired, sodium sulfide may be used in place of or along with elemental sulfur. If desired, sodium thiosulfate or sodium hydrosulfide may also be added to the leach liquor. Regardless of whether sodium sulfide, sodium thiosulfate, or sodium hydrosulfide are added directly to the leach liquor, elemental sulfur and sodium hydroxide combine to form a leach liquor containing sodium sulfide, sodium polysulfide, and sodium thiosulfate, according to the following reactions:

$$4S^o + 6NaOH \rightarrow 2Na_2S + Na_2S_2O_3 + 3H_2O$$

$$(x-1)S^o + Na_2S \rightarrow Na_2S_x \text{ (where } x=2 \text{ to } 5)$$

In this manner, the sulfur initially added to the caustic forms thiosulfate and sulfide. Further addition of sulfur to the sulfide solution forms sodium polysulfide as shown in Example 1E above. If sodium hydrosulfide is added, NaOH is added so that the following reaction takes place:

$$NaSH + NaOH \rightarrow Na_2S + H_2O$$

According to the present invention, sodium thiosulfate is an effective catalyst for leaching antimony from antimony-containing materials. As illustrated in Tables 1A and 1C, above, increased concentrations of thiosulfate in test runs always resulted in faster and higher percent recoveries of antimony (and antimony in the preferred +5 state). By comparison, sulfur addition (and therefore polysulfide addition) did at initial, lower levels increase antimony recovery. However, at higher levels, sulfur addition actually decreased antimony recovery. Nonetheless, at high levels of sulfur (polysulfide) addition a high percent recovery can be attained by a larger initial addition of caustic to the leach liquor.

As mentioned above, sodium thiosulfate (and therefore thiosulfate) is formed in the leach liquor when elemental sulfur is combined with caustic. If desired, higher concentrations of thiosulfate may also be obtained by adding thiosulfate directly to the leach liquor. As will be discussed later, the downstream stages of the process of the present invention, such as electrowinning and sodium hydroxy antimonate production, generate solutions rich in thiosulfate. These solutions may be recycled to the leach liquor to take advantage of the beneficial leaching qualities of thiosulfate.

Although sodium carbonate, $Na_2CO_3$, was added to the leach liquor of the above examples, sodium carbonate has little or no effect on the leaching stage of the process. Accordingly, sodium carbonate may, but need not, be added to the leach liquor. As will be discussed below, sodium carbonate is preferably added before electrowinning.

The total sulfur content of the leach liquor preferably ranges from about 1 to 400 g/L, more preferably from about 20 to 300 g/L, and most preferably from about 100 to 200 g/L. All or none of the total sulfur in the leach liquor may be supplied by elemental sulfur, however it is preferred that from about 10% to 80% be supplied by elemental sulfur, and it is more preferred that from about 10% to 30% be from elemental sulfur.

The leach liquor also preferably may include the following components in the concentrations indicated: from about 0 to 300 g/L thiosulfate, from about 0 to 750 g/L NaOH, from about 0 to 450 g/L hydrosulfide, and from about 0 to 400 g/L sulfide. It is more preferred that the leach liquor include from about 10 to 200 g/L thiosulfate, from about 50 to 500 g/L NaOH, from about 0 to 350 g/L hydrosulfide, and from about 0 to 300 g/L sulfide, and it is most preferred that the leach liquor include from about 25 to 100 g/L thiosulfate, from about 50 to 300 g/L NaOH, from about 10 to 250 g/L hydrosulfide, and from about 10 to 200 g/L sulfide.

The antimony-containing feed material is added to the leach liquor to obtain a solids content of preferably from about 1 to 500 g/L, more preferably from about 20 to 400 g/L, and most preferably from about 100 to 200 g/L. The particle size is preferably about 80% $-\frac{1}{2}"$, more preferably about 80% $-\frac{1}{4}"$, and most preferably about 80% $-325$ mesh. The leaching vessel is preferably agitated from about 0 to 5000 rpm, more preferably from about 500 to 1500 rpm, and most preferably from about 800 to 1200 rpm. As will be recognized by those of ordinary skill in the art, the agitation rate will depend upon such factors as the vessel configuration, the method of agitation, and the type of agitator used.

During leaching, the temperature is preferably maintained at from about 201° to 400° C., more preferably from about 50° to 160° C., and most preferably from about 105° to 140° C. The reaction may take place in an enclosed or open vessel in a batch or continuous manner with or without pressurization. The pressure in the leaching vessel is typically the resultant vapor pressure of the leach liquor chosen at the temperature chosen. The leaching is conducted preferably for about 1 to 36 hours, more preferably for about 3 to 15 hours, and most preferably for about 10 to 13 hours. Those of ordinary skill in the art will recognize that the desired time for leaching is selected in light of the degree of antimony recovery desired and will vary depending upon a number of factors, such as the feed material provided, the reagents used, and the temperature of the leaching.

After leaching, the leach slurry is settled, thickened, and filtered to yield an insoluble solid residue and a clarified, pregnant leach liquor. The insoluble solid residue contains solids which have been sulfidized by the leaching step. This makes the solids more stable and more readily processed by established metallurgical techniques such as flotation and smelting. If necessary, precious metals solubilized in the process are precipitated by cementation, pH adjustment, absorption, or other practices established in the art.

Antimony compounds are then crystallized from the clarified, pregnant leach liquor by some means of reaching the saturation point of the antimony in solution. Those of ordinary skill in the art will recognize that this may be done in a number of ways, such as by cooling, evaporation, or chemical means. The crystallization is preferably achieved by cooling the solution to precipitate the desired crystallized antimony compounds. Example 2, below, provides an example of the crystallization stage.

EXAMPLE 2

Crystallization

This example illustrates the separation of antimony from a pregnant leach liquor. The mass balance illustrates the final degree of separation between the solid crystallized antimony compounds and the decrystallized solution, or barren leach liquor.

In a glass beaker 3 liters of antimony pregnant leach liquor were heated to 80° C. The pregnant leach liquor was allowed to cool to 15° C. Samples of the leach liquor were taken during cooling and were analyzed for Sb, As and Hg content. This data is summarized in Table 2. At the end of the separation, assays were performed on both the solid and liquid fractions produced. As can be seen in the overall mass balance presented in Table 2, over 90% of the antimony precipitated out of the leach liquor while such problem species as arsenic, mercury, sulfate, and thiosulfate remained in the liquid phase. Additionally, the color of the barren leach liquor indicated that an abundance of polysulfide was left in the solution. Also, metal ions such as Fe and Cu remained in solution.

TABLE 2

| | Crystallization Results | | | |
|---|---|---|---|---|
| | Start Solution | Final Solution | Final Solids | % Removal From Solution |
| Sb | 158.50 g | 13.90 g | 144.60 g | 91.2% |
| As | 17.60 g | 16.70 g | 0.90 g | 5.1% |
| Hg | 0.45 g | 0.38 g | 0.07 g | 15.5% |
| Sb/As (wt. ratio) | 9.0 /1 | 0.8 /1 | 160.7 /1 | — |
| Sb/Hg (wt. ratio) | 352.4 /1 | 36.6 /1 | 2065.7 /1 | — |
| $SO_4$ | 46.19 g | 39.78 g | 6.41 g | 13.9% |
| $SO_3$ | 51.24 g | 19.82 g | 31.42 g | 61.2% |
| $S^{-2}$ | 189.25 g | 36.98 g | 152.27 g | 80.5% |
| $S_2O_3$ | 141.34 g | 113.30 g | 28.04 g | 19.8% |

The clarified, pregnant leach liquor for crystallization preferably includes from about 1 to 300 g/L Sb, more preferably from about 20 to 125 g/L Sb, and most preferably from about 40 to 100 g/L Sb. The crystallization is preferably carried out at a temperature of from about 0° to 105° C., more preferably from about 5° to 80° C., and most preferably from about 10° to 30° C. The crystallization is preferably carried out over a period of from about 0.1 to 48 hours, more preferably from about 0.1 to 3 hours, and most preferably from about 0.5 to 1.5 hours. The crystallization vessel is preferably agitated from about 0 to 5000 rpm, more preferably from about 300 to 2500 rpm, and most preferably from about 300 to 800 rpm. Those of ordinary skill in the art will recognize that the agitation rate will depend upon such factors as the type of crystallization vessel used, the method of agitation, and the type of agitator used.

The crystallization stage preferentially crystallizes antimony out of solution primarily as sodium thioantimonate. The crystallization stage also leaves impurities in the barren leach liquor, including arsenic which would impair later electrowinning and useful reagents in aqueous form which may be returned to the leaching stage for reuse. If desired, the crystallized antimony compounds may be dissolved in water or a water and caustic solution and recrystallized as many times as necessary to derive the desired purity for the product to be made. Alternatively, the purified, crystallized antimony compounds may be sold without further treatment.

After crystallized antimony compounds of the desired purity are obtained, they may be redissolved in a solution of water or water and NaOH. This solution is filtered and any undissolved solids are returned to the leaching stage. As discussed below, the filtered, purified crystallized antimony compound solution may then be further processed to create a variety of high quality, high purity, antimony products. For example, high purity antimony metal may be obtained by electrowinning the solution (FIG. 2A). Example 3A, below, illustrates the use of electrowinning to obtain antimony metal of high purity.

The use of the crystallized antimony compound solution for electrowinning permits a "clean solution" to be used in the process. The solution is "clean" in terms of being relatively free from arsenic, other impurity metals, and sulfur compounds such as polysulfide, sulfate, thiosulfate, and free sulfide which can disrupt the electrowinning process. The use of the clean solution also limits the formation of arsine gas, a problem found in other electrowinning processes. Thus, a diaphragmless system may be used where a diaphragmed system would otherwise be used. Those of ordinary skill in the art will recognize that a diaphragmed system could also be used for electrowinning, and since the clean solution would be used, superior results would be achieved compared to other electrowinning processes utilizing a diaphragmed cell.

The use of the crystallized antimony compounds to make the solution for electrowinning allows one to customize the electrowinning solutions to provide optimal conditions. In that regard, the antimony concentrations and hydroxide concentrations can be readily and simply adjusted to desired levels for optimal results. Additionally, knowing the solution characteristics enables one to adjust such things as the anodic and cathodic current densities and the agitation rate to optimum operating levels. The use of a customized solution in the process allows a reduction in the power usage and a regeneration of sodium hydroxide, free sulfide, thiosulfate, and polysulfide in the process.

The regenerated solution may be returned to the leaching stage or may be routed to an autoclave for similar reuse. Also, as illustrated in Examples 3A-3G, one may use lower temperatures, addition of sodium carbonate, addition of sodium sulfite, higher cathodic current density, higher anodic current density, and lower agitation to increase current efficiency and obtain other beneficial results.

The solution may be chemically "customized" to perform more efficiently by adding sodium sulfite and sodium carbonate. The sodium sulfite and sodium carbonate are preferably added to the redissolved crystallized antimony compound solution after filtration to avoid interference with the filtration. Both compounds will increase current efficiency and reduce power usage in the process. Sodium sulfite usage also promotes formation of sodium thiosulfate in the final electrowinning solution by the following mechanism:

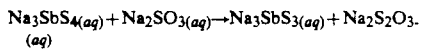

The sulfite reduces the +5 thioantimonate to +3 thioantimonite. Compared to the +5 thioantimonate, the +3 thioantimonite consumes much less energy consumption when reacting to form Sb metal at the cathode. The accompanying formation of sodium thiosulfate can be utilized when the final solutions are recycled back to the leach step.

Sodium sulfite addition can also reduce any polysulfides formed at the anode during the electrowinning process to sodium thiosulfate and sodium sulfide. This is illustrated in the following example:

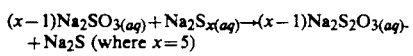

This phenomenon aids in achieving higher current efficiencies while providing sodium thiosulfate and sodium sulfide in the final solutions. Again, presence of these compounds in the final solutions can enhance the leach step if recycled.

Finally, because the crystallized antimony compound solutions are clean and customized, the creation of "crust" (sodium sulfate buildup) and the danger of arsine generation which are prevalent in most electrowinning situations is mitigated or eliminated. These are significant problems which are avoided by the process of the present invention.

EXAMPLE 3A

Baseline Diaphragmless Electrowinning

This is an example of diaphragmless electrowinning to make Sb metal from crystallized antimony compounds produced by crystallization purification.

1050 grams of moist crystallized antimony compounds were added to a glass beaker with 420 grams of NaOH. This represented a total addition of 225.0 g of Sb. Water was added to this solution to bring the total volume of the solution up to 3 liters. The resulting solution was put in a rectangular mild steel electrowinning cell. Three steel cathodes measuring 10.3 cm by 9.6 cm in working area and two steel anodes measuring 12.1 cm by 12.7 cm in working area were put in the cell containing the solution. A single prop agitator was put in the middle of the cell between the cathodes and anodes, and the cell solution was agitated at a rate of 700 rpm. 50 amps of DC power was then supplied to the anodes and cathodes by a rectifier. This gave an anodic current density of 843 Amp/m$^2$ and a cathodic current density of 813 Amp/m$^2$. The temperature of the solution was maintained at 50° C. To control anodic gassing, a mist suppressant, such as FC-100 manufactured by 3M, was added to the cell when necessary.

The test ran for 6 hours producing a Faradaic current efficiency of 51.4%. Power usage averaged 6673 Kw-Hr/Ton of Sb metal produced. Additionally, the Sb metal produced was of the following typical high quality:

Sb = >99.7%
Na = 2000 ppm
Fe = 200 ppm
As = <100 ppm
Pb = 5 ppm

The solutions remaining were low in antimony content and contained free sulfide ions, polysulfide, regenerated hydroxide ions, and sodium thiosulfate. As such, this was a good solution for recycle back to the leach. Also, the final hydroxide concentration was 27.8 g/L compared to the initial solution concentration of 33.3 g/L. Samples taken at timed intervals during testing indicated an initial consumption of hydroxide in the process. This is a normal consequence of events in antimony electrowinning processes. However, 4 hours into the test, the hydroxide levels began to rise indicating a regeneration of hydroxide. This is an unexpected result which is peculiar to the process of the present invention.

EXAMPLE 3B

Lower Temperature Control Diaphragmless Electrowinning

This is an example of diaphragmless electrowinning to make antimony metal from crystallized antimony compounds produced from crystallization purification.

The test was conducted under conditions substantially identical to the conditions of Example 3A except that the temperature of the solution was maintained at 40° C. rather than 50° C. The test produced a Faradaic current efficiency of 60.1% which compares favorably with the baseline value of 51.4% from Example 3A. Power usage was 5917 Kw-Hr/Ton which also compares favorably to the baseline value of 6673 Kw-Hr/Ton from Example 3A. Additionally, the antimony metal produced was of the high quality found in Example 3A.

The solutions remaining were low in antimony content and contained free sulfide ions, polysulfide, regenerated hydroxide ions, and sodium thiosulfate. As such, this was a good solution for recycle back to the leach.

EXAMPLE 3C

Sodium Sulfite Addition Diaphragmless Electrowinning

This is an example of diaphragmless electrowinning to make antimony metal from crystallized antimony compounds produced from crystallization purification.

The test was conducted under conditions substantially identical to the conditions of Example 3A except that 95.0 grams of sodium sulfite was added to the solution to be electrowon before water was added to the solution to bring the volume of the solution up to 3 liters. This resulted in a sulfite concentration of 20.0 g/L. This test produced a Faradaic current efficiency of 61.7% which compares favorably with the baseline value of 51.4% from Example 3A. Power usage averaged 5368 Kw-Hr/Ton of antimony metal produced which is superior to the baseline value of 6673 Kw-Hr/Ton from Example 3A. Additionally, the antimony metal produced was of the high quality found in Example 3A.

The solutions remaining were low in antimony content and contained free sulfide ions, polysulfide regenerated hydroxide ions, and sodium thiosulfate. As such, this was a good solution for recycle back to the leach.

EXAMPLE 3D

Sodium Carbonate Addition Diaphragmless Electrowinning

This is an example of diaphragmless electrowinning to make antimony metal from crystallized antimony compounds produced from crystallization purification.

The test was conducted under conditions substantially identical to the conditions of Example 3A except that 294.0 grams of sodium carbonate was added to the solution to be electrowon before water was added to the solution to bring the volume of the solution up to 3 liters. This resulted in a carbonate concentration of 55 g/L.

The test produced a Faradaic current efficiency of 58.7% and power usage of 5797 Kw-Hr/Ton of antimony metal produced. This compares favorably with the baseline values of 51.4% and 6673 Kw-Hr/Ton from Example 3A. Additionally, the antimony metal produced was of the high quality found in Example 3A.

The solutions remaining were low in antimony content and contained free sulfide ions, polysulfide, regenerated hydroxide ions, and sodium thiosulfate. As such, this was a good solution for recycle back to the leach.

EXAMPLE 3E

Higher Cathodic Current Density Diaphragmless Electrowinning

This is an example of diaphragmless electrowinning to make antimony metal from crystallized antimony compounds produced from crystallization purification.

The test was conducted under conditions substantially identical to the conditions of Example 3A except that three cathodes measuring 7.2 cm by 7.6 cm in working area and two anodes measuring 12.1 cm by 12.7 cm in working area were put in the cell containing the solution. This gave an anodic current density of 813 Amp/m$^2$ and a cathodic current density of 1523 Amp/m$^2$. The test produced a Faradaic current efficiency of 58.3% which compares favorably with the baseline value of 51.4% from Example 3A. Additionally, the antimony metal produced was of the high quality found in Example 3A.

The solutions remaining were low in antimony content and contained free sulfide ions, polysulfide, regenerated hydroxide ions, and sodium thiosulfate. As such, this was a good solution for recycle back to the leach.

EXAMPLE 3F

Higher Anodic Current Density Diaphragmless Electrowinning

This is an example of diaphragmless electrowinning to make antimony metal from crystallized antimony compounds produced from crystallization purification.

The test was conducted under conditions substantially identical to the conditions of Example 3A except that three cathodes measuring 10.3 cm by 9.6 cm in working area and two anodes measuring 10.3 cm by 9.6 cm in working area were put in the cell containing the solution. This gave an anodic current density of 1264 Amp/m$^2$ and a cathodic current density of 843 Amp/m$^2$. The test produced a Faradaic current efficiency of 73.4% and a power usage of 5100 Kw-Hr/Ton. This compares favorably with the baseline values of 51.4% and 6673 Kw-Hr/Ton from Example 3A. Additionally, the antimony metal produced was of the high quality found in Example 3A.

The solutions remaining were low in antimony content and contained free sulfide ions, polysulfide, regenerated hydroxide ions, and sodium thiosulfate. As such, this was a good solution for recycle back to the leach.

EXAMPLE 3G

Lowered Agitation Diaphragmless Electrowinning

This is an example of diaphragmless electrowinning to make antimony metal from crystallized antimony compounds produced from crystallization purification.

The test was conducted under conditions substantially identical to the conditions of Example 3A except that the single prop agitator agitated the cell solution at a rate of 45 rpm. The test produced a Faradaic current efficiency of 68.8% and power usage averaged 5046 Kw-Hr/Ton of antimony metal produced. This compares favorably with the baseline values of 51.4% and 6673 Kw-Hr/Ton from Example 3A. Additionally, the antimony metal produced was of the high quality found in Example 3A.

The solutions remaining were low in antimony content and contained free sulfide ions, regenerated hydroxide ions, and sodium thiosulfate. As such, this was a good solution for recycle back to the leach.

The solution to be electrowon preferably has from about 1 to 200 g/L Sb, more preferably has about 20 to 150 g/L Sb, and most preferably has about 40 to 100 g/L Sb.

Sodium hydroxide is added to the solution to be electrowon in a weight ratio according to the amount of antimony being processed. It is preferred that the weight ratio of sodium hydroxide to contained antimony be from about 0.1:1 to 10.0:1, more preferably about 0.5:1 to 5.0:1, and most preferably about 0.8:1 to 4.0:1.

Sodium carbonate and sodium sulfite are preferably added so that the solution contains from about 0 to 200 g/L carbonate and from about 0 to 200 g/L sulfite, more preferably so that the solution contains about 0 to 100 g/L carbonate and about 0 to 100 g/L sulfite, and most preferably so that the solution contains about 0 to 75 g/L carbonate and about 10 to 50 g/L sulfite.

During electrowinning, the temperature is maintained preferably within the range of from about 10° to 120° C., more preferably from about 20° to 80° C., and most preferably from about 30° to 60° C. The solution is preferably agitated at a rate of from about 0 to 4000 rpm, more preferably about 0 to 2000 rpm, and most preferably about 0 to 100 rpm. Those of ordinary skill in the art will recognize that the agitation rate will depend upon such factors as the actual cell configuration, the agitation method used, and the type of agitator used. The electrowinning is preferably performed to provide both cathodic and anodic current densities of from about 1 to 10,000 Amp/m$^2$, more preferably from about 1 to 5000 Amp/m$^2$, and most preferably from about 500 to 2000 Amp/m$^2$. The electrowinning is preferably performed for about 0.5 to 120 hours, more preferably for about 1 to 24 hours, and most preferably for about 3 to 15 hours. The time required is dependent upon such factors as the nature of the solution to be electrowon, the carbonate concentration, the agitation rate, and the temperature.

Figure 2B:
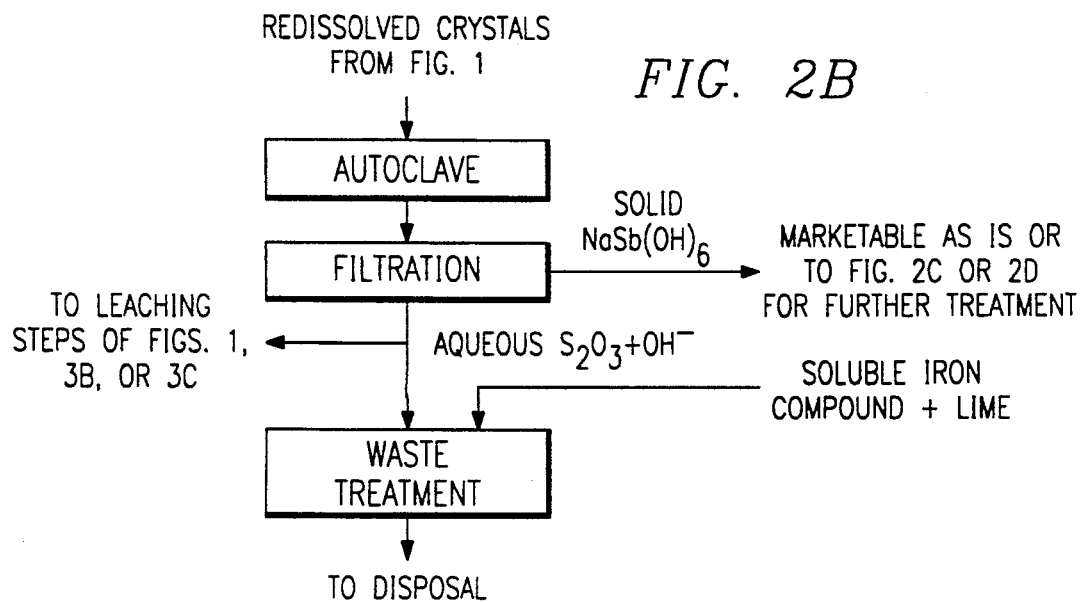
FIG. 2B is a flow diagram of a process of the present invention for obtaining sodium hydroxy antimonate from redissolved crystallized antimony compounds obtained from the process of FIG. 1.
Figure 3A:
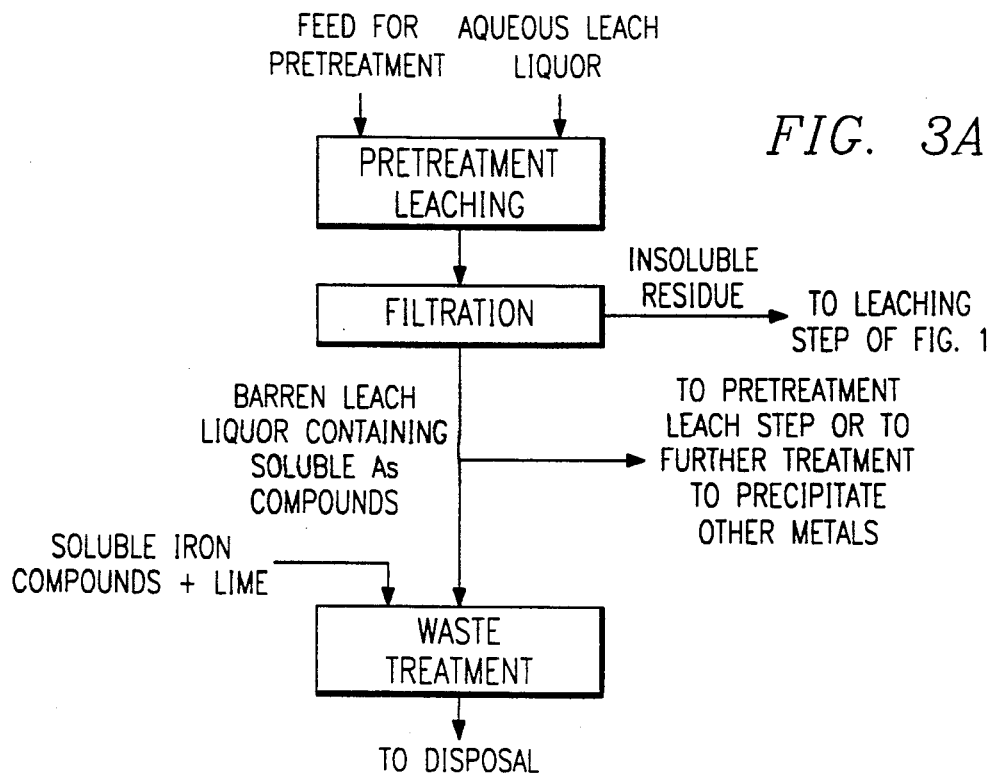
FIGS. 3A, 3B, and 3C are flow diagrams of alternate embodiments of a pretreatment process of the present invention for arsenic- and antimony-containing material.
Figure 3B:
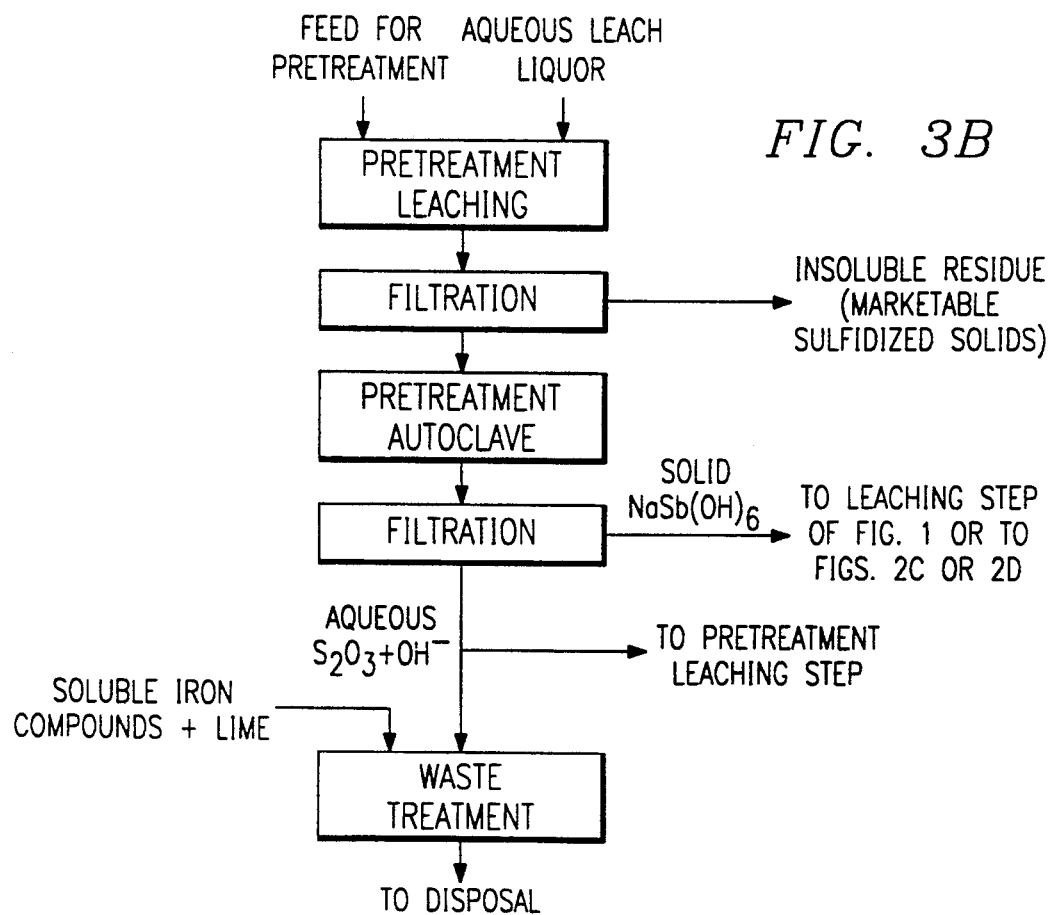
Figure 3C:
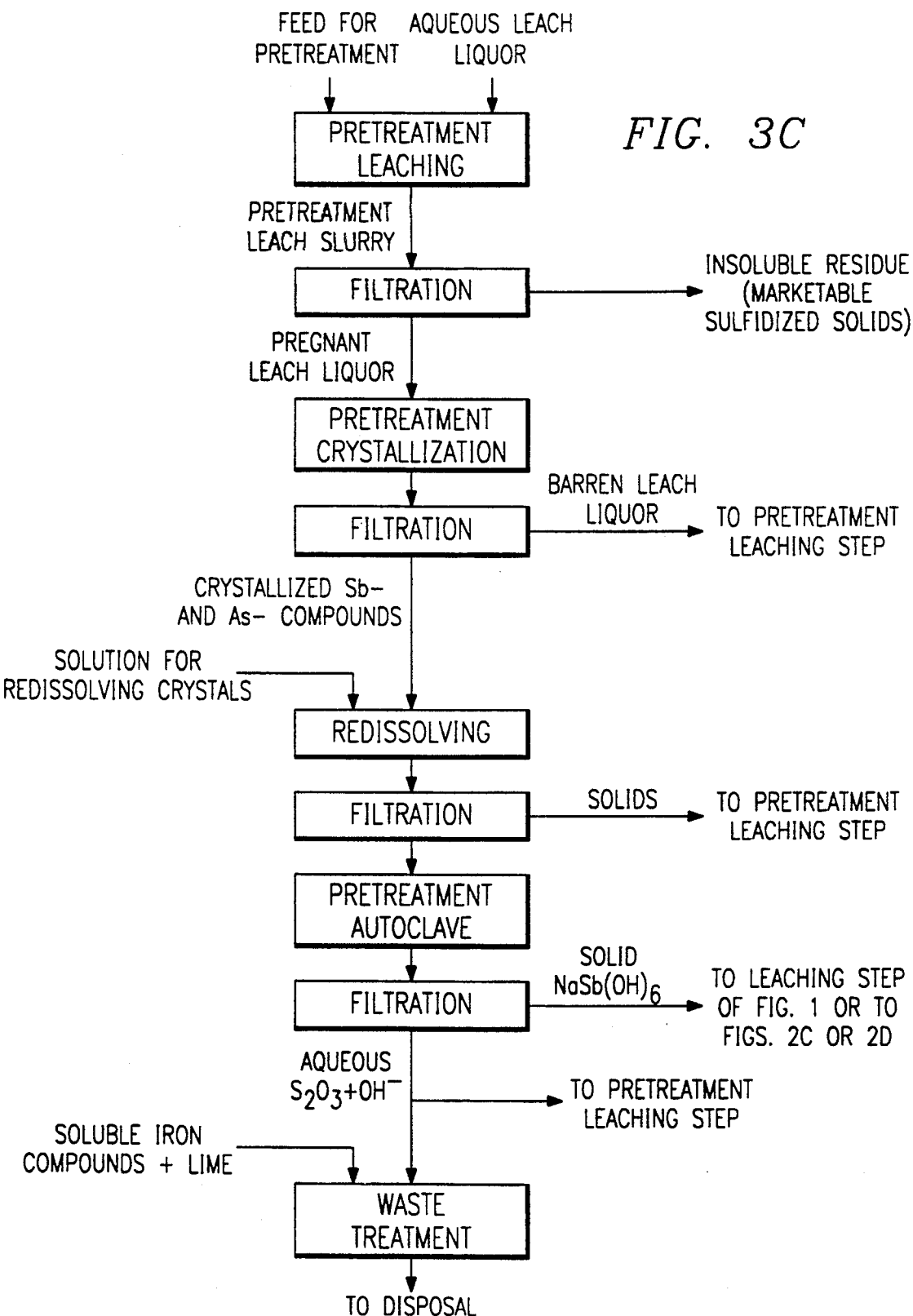

Sodium hydroxy antimonate (NaSb(OH)$_6$) of high purity may also be created from the crystallized antimony compound solution by autoclaving the solution under oxygen pressure and heat (FIG. 2B). Example 4, below, illustrates the use of autoclaving to obtain sodium hydroxy antimonate.

EXAMPLE 4

Sodium Hydroxy Antimonate Production: Autoclaving

This example illustrates the use of autoclaving to produce sodium hydroxy antimonate from crystallized antimony compounds produced from crystallization of the clarified, pregnant leach liquor, discussed above.

A solution was made from 2600 g of moist crystallized antimony compounds and 585 g NaOH. Water was added to bring the total volume of the solution up to 5.0 liters. The solution assayed 125.2 g/L Sb and 0.9 g/L excess, free $OH^-$. This solution was put in an 8 liter stainless steel autoclave. The solution was stirred with dual axial props. One was located at the bottom of the vessel while one was located at the slurry/head space interface. The solution was heated to 95° C. Then, using oxygen, the head space was purged of any inert gases. The pressure vessel was then sealed off and pressurized to 90 psig with oxygen. The temperature setpoint was put at 150° C. The oxidation reaction commenced and lasted for 3.5 hours. At this point, 0.9 g/L of Sb was left in solution. The pressure vessel was cooled, depressurized and the slurry discharged. The solid sodium hydroxy antimonate was then filtered from the slurry and dried at 85° C. to remove free moisture. A typical assay for this high-grade material is as follows:

Sb = 49.34%
Na = 9.32%
As = 62 ppm
Cu = 3 ppm
Fe = 28 ppm
Pb < 10 ppm
% Water of crystallization = 21.88%

The solution to be autoclaved preferably has about 1 to 300 g/L Sb, more preferably has about 1 to 150 g/L Sb, and most preferably has about 1 to 100 g/L Sb. The solution may, but need not, have an excess of $OH^-$ and, in that regard, preferably has an excess of about −100 to 750 g/L $OH^-$, more preferably has an excess of about −25 to +200 g/L $OH^-$, and most preferably has an excess of about −10 to +50 g/L $OH^-$. It is understood that a negative value for excess $OH^-$ concentration represents a deficiency in hydroxide ions relative to the stoichiometric point where free hydroxide would be generated in the solution. The solution preferably has a pH of about 12.5 to 16.0, more preferably has a pH of about 12.5 to 14.0, and most preferably has a pH of about 12.5 to 13.5. It is understood that the desired time for autoclaving will depend upon the degree of desired antimony recovery and will also vary depending upon such factors as the composition of the solution to be autoclaved, the reagents used, the temperature, and the pressure.

During autoclaving, the temperature is preferably maintained at from about 20° to 300° C., more preferably from about 50° to 200° C., and most preferably from about 90° to 150° C. The oxygen partial pressure is preferably maintained at about 1 to 2500 psig, more preferably at about 1 to 1000 psig, and most preferably at about 1 to 125 psig. The quantity of oxygen consumed is not important to the antimony-arsenic separation process. While it is advisable to carry out the reaction to at least the point where no more oxygen is consumed, providing excess oxygen is not a problem in the process of the present invention. Indeed, it is advantageous for the separation, regeneration and tails treatment processes to ensure that all of the arsenic, antimony and sulfur components of the solution are completely oxidized by providing excess oxygen. This ensures that the final slurry contains an abundance of solid sodium hydroxy antimonate, soluble sodium thiosulfate and soluble arsenic in the +5 state. In particular, supplying an abundance of oxygen to ensure production of +5 arsenic results in much better precipitation/fixation of arsenic downstream tails treatment with soluble iron compounds. Also, in the described procedure, over supply of oxygen will not compromise the ability of the process to separate antimony from arsenic. Instead, it will serve to enhance such separation ensuring that the arsenic is fully reacted from sodium thioarsenate and sodium thioarsenite to sodium arsenate, which is much more soluble than sodium thioarsenate and sodium thioarsenite. The solution is preferably agitated at a rate of from about 0 to 5000 rpm, more preferably from about 0 to 1000 rpm, and most preferably from about 0 to 1000 rpm. Those of ordinary skill in the art will recognize that the agitation rate will depend upon such factors as the reactor configuration, the method of agitation, and the type of agitator used.

The autoclaving is preferably carried for about 0.1 to 240 hours, more preferably for about 0.5 to 12 hours, and most preferably for about 0.5 to 10 hours. Those of ordinary skill in the art will recognize that the desired time for autoclaving will depend upon the degree of antimony recovery desired and will also vary depending upon such factors as the composition of the solution to be autoclaved, the reagents used, the temperature, and the pressure.

As illustrated in Example 4 and discussed above, the redissolved crystallized antimony compounds are treated in an autoclave under oxygen pressure and heat to produce sodium hydroxy antimonate. After autoclaving, solid sodium hydroxy antimonate is filtered from the solution. The remaining solution is rich in thiosulfate (approximately 50 to 200 g/L) and free excess hydroxide ions (approximately 1 to 10 g/L) and therefore all or a portion of the remaining solution may be recycled to the leaching stage. Alternatively, all or a portion of the solution may be sent to disposal. In that regard, it is important to provide a means of safely disposing of such waste material, so the portion for disposal is preferably subjected to waste treatment. Example 8, below, illustrates a desired waste treatment stage in which the solution is treated with soluble iron compounds and lime to cleanse the solution of hazardous substances. This treatment precipitates arsenic as well as other soluble metal ions resulting in, after settling, a clean aqueous solution.

Figure 2C:
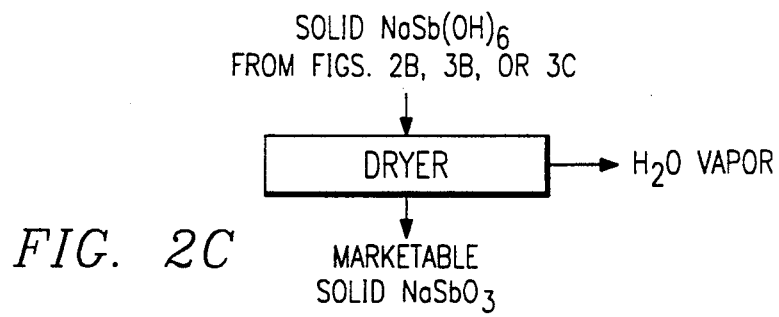
FIG. 2C is a flow diagram of a process of the present invention for obtaining sodium antimonate from redissolved crystallized antimony compounds obtained from the process of FIG. 1.
Figure 2D:
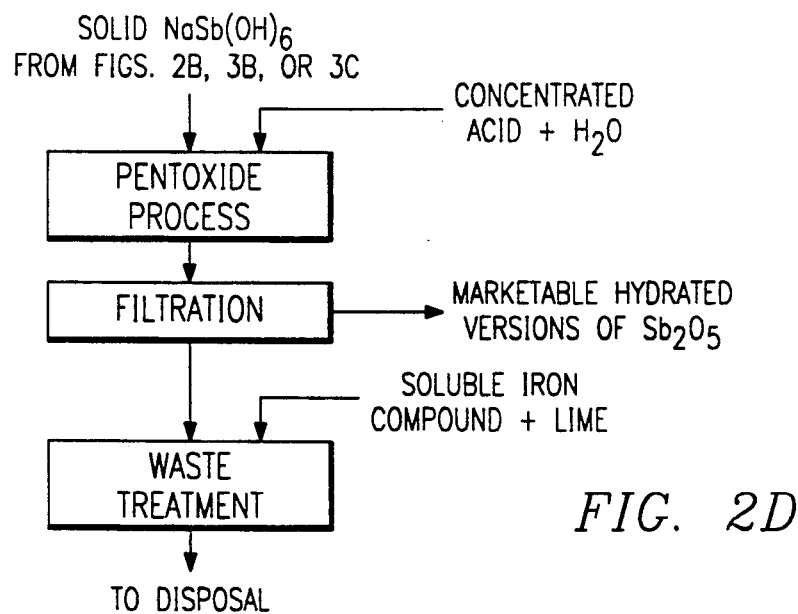
FIG. 2D is a flow diagram of a process of the present invention for obtaining antimony pentoxide from redissolved crystallized antimony compounds obtained from the process of FIG. 1.

The sodium hydroxy antimonate obtained from the autoclaving process may be marketed as is or further treated to obtain other antimony products (FIGS. 2C and 2D). For example, the sodium hydroxy antimonate may be treated as in Example 5, below, to obtain sodium antimonate of high purity. In this process, the sodium hydroxy antimonate obtained by autoclaving is heated in an open vessel to remove waters of hydration from the compound. In this manner, sodium antimonate of high purity is obtained.

EXAMPLE 5

Sodium Antimonate Production: Drying

This example illustrates the production of high grade sodium antimonate from high grade sodium hydroxy antimonate by drying.

100 grams of sodium hydroxy antimonate from Example 4 was heated in a beaker on a hot plate to 350° C. In less than 30 minutes, a 21.88% weight loss occurred. This represented a loss of waters of hydration from the compound. As such, the sodium hydroxy antimonate was transformed into sodium antimonate. This material had a typical assay of:

Sb=63.16%
As=65 ppm
Na=11.93%
Pb<10 ppm
Cu=4 ppm
Fe=30 ppm

Alternatively, the sodium hydroxy antimonate obtained by autoclaving may be treated with an acid to obtain antimony pentoxide as illustrated in FIG. 2D and as discussed in Example 6, below. In the acid treatment, the solid sodium hydroxy antimonate is treated with a concentrated acid, preferably concentrated (approximately 95-98%) sulfuric acid. It is understood that other acids, such as nitric acid or hydrochloric acid, may also be used.

EXAMPLE 6

Antimony Pentoxide Production: Acid Treatment

This example illustrates the production of antimony pentoxide from sodium hydroxy antimonate.

200 grams of sodium hydroxy antimonate containing 6.5% free moisture was placed in a two liter glass beaker. To this, 300 ml (550.8 g) of concentrated (95-98%) sulfuric acid were added. Then, water was added to bring the total volume of the mixture to one liter. This mixture was then heated and stirred at the boiling temperature of the mixture for 150 minutes. After this time, the resulting slurry was cooled and filtered on a Buchner filter. The solids were dried and analyzed by x-ray diffraction to confirm that the final product was $Sb_2O_5.4H_2O$, a hydrated version of antimony pentoxide. Those of ordinary skill in the art will recognize that by varying the temperature, time of reaction, and acid concentration, the amount of hydration of the pentoxide product can be varied.

In the acid treatment of the present invention, the mixture for treating the sodium hydroxy antimonate has an acid concentration in volume percentage which is preferably in the range of from about 0.5% to 90%, is more preferably in the range of from about 5.0% to 50%, and is most preferably in the range of from about 10% to 40%. Enough solid sodium hydroxy antimonate is preferably added to give a solids concentration of from about 1 to 500 g/L, more preferably of from about 10 to 250 g/L, and most preferably of from about 100 to 200 g/L. During the acid treatment, the temperature is preferably maintained at from about 0° to 400° C., more preferably at from about 20° to 150° C., and most preferably at from about 40° to 100° C. The solution is agitated at a rate of preferably from about 0 to 5000 rpm, more preferably from about 100 to 1000 rpm, and most preferably from about 400 to 900 rpm. Those of ordinary skill in the art will recognize that this agitation rate will depend upon such factors as the reactor chosen, the method of agitation chosen, and the type of agitator used. The acid treatment is performed preferably for about 0.1 to 120 hours, more preferably for about 0.5 to 6 hours and most preferably for about 0.5 to 3 hours.

After the acid treatment, the resulting slurry is filtered to obtain a marketable solid, hydrated version of antimony pentoxide, such as solid $Sb_2O_5.4H_2O$. The filtered solution is then treated with soluble iron compounds and lime and sent to disposal. This waste treatment stage is substantially similar to the waste treatment discussed in Example 8, below.

In yet another alternative, the products of the present process may be used to obtain high quality antimony pentasulfide in the manner suggested in Tian-Cong, Zhao, *The Metallurgy of Antimony*, 1988, Central South University Press, pp. 548–49, the disclosure of which is incorporated herein by reference. In this regard, sodium thioantimonate may be reacted with nitric acid or hydrochloric acid. The concentration of the acid is maintained at 5% to 10% and acid excess is maintained at 15% to 25%. A solution may be used containing 10% to 20% sodium thiosulfate at a rate of 0.2 to 0.3 g per kg contained antimony, under conditions of air agitation and cooling to 10° C. for the solution. This will generate a high quality antimony pentasulfide with respect to the $Sb_2S_5$ and $Sb_2S_3$ content. This will also stabilize the free sulfur content at 6% to 7%.

Some feed materials may require pretreatment for efficient production of high quality antimony products. Generally this requires treating the feed material so that the contained antimony may be leached in lieu of any contaminants which may have a tendency to follow the antimony into solution. The most common example of such a contaminant is arsenic.

The presence of relatively high amounts of arsenic in the antimony-containing feed material will negatively impact the purity of the antimony products obtained using the above processes because the arsenic will tend to follow the antimony into the leach solution and then to form crystals along with the crystallized antimony compounds. To obtain a high degree of separation during the crystallization stage, such as that demonstrated in Example 2, it is desirable to reduce the weight ratio of arsenic to antimony in the clarified, pregnant leach liquor (and therefore the weight ratio of soluble arsenic to soluble antimony in the feed material) so that the clarified, pregnant leach liquor may reach the saturation point of antimony compounds therein without reaching the saturation point of arsenic compounds therein.

Under certain circumstances, it may therefore be desirable to pretreat the feed materials to ensure that the desired separation of antimony from arsenic may be obtained during the crystallization stage. As examples, the weight ratio of soluble arsenic to soluble antimony in the feed material of Example 1A was approximately 0.08. At this low weight ratio of soluble arsenic to soluble antimony, pretreatment of the feed material is generally unnecessary. By comparison, the feed materials of Examples 7A and 7B, set forth below, had a weight ratio of soluble arsenic to soluble antimony of approximately 3.0. Feed material having this high of a weight ratio of soluble arsenic to soluble antimony typically should be pretreated. As a general rule, pretreatment will be desirable for materials containing weight ratios of soluble arsenic to soluble antimony of greater than 0.8. Materials with ratios of soluble arsenic to soluble antimony equal to or less than 0.8 can generally be treated directly by the process outlined in FIG. 1 without pretreatment. FIGS. 3A-3C depict alternate embodiments of the pretreatment process, and Examples 7A-7C, below, illustrate optional embodiments of the pretreatment leaching stage for a feed material having a high weight ratio of soluble arsenic to soluble antimony.

EXAMPLE 7A

Pretreatment Leaching

This is an example of the pretreatment leaching of material having a high weight ratio of soluble arsenic to soluble antimony. Arsenic is leached from the pretreatment feed material to leave a solid which has a low weight ratio of soluble arsenic to soluble antimony. NaOH is used as the leaching agent. Alternatively, soda ash, $Na_2CO_3$, can be been used in lieu of NaOH in this example to obtain similar pretreatment results.

In this test, solids containing 0.26% In, 42.0% Pb, 13.40% Zn, 4.20% Sb, 12.60% As, 0.92% Cd, and 0.016% Ag were leached. This material had a high weight ratio of soluble arsenic to soluble antimony. For the test, 75.0 g of the above solids were leached in an agitated vessel for 4 hours at 105° C. in one liter of solution containing 142 g/L NaOH. After leaching was complete, the remaining solids were filtered from the liquids and a mass balance was performed. The remaining solids had a low weight ratio of soluble arsenic to soluble antimony and assayed as 17.8% Sb and 1.04% As. 98.1% of the As, 75.3% of the Pb, and 78.1% of the Zn were solubilized in the clarified, pregnant leach liquor. Almost 100% of the other metals including Ag, In, Cd, and Sb were not solubilized and remained in the solid phase. The remaining solid material could now be treated to make marketable antimony products using the processes of the present invention depicted in FIGS. 1 and 2A-2D. The clarified, pregnant leach liquor from this leach could also be pretreated further in the manner outlined in FIGS. 3B and 3C, such as by recycling, autoclaving, or crystallizing. Before so treating the clarified, pregnant leach liquor, it is advantageous to precipitate the soluble Zn, Cu, Pb and metal ions other than arsenic and antimony. This can be done by adding hydrosulfide, polysulfide, thiosulfate, sulfide or sulfur to the solution. The precipitated sulfidized solids may be separated by filtration and marketed or processed further.

EXAMPLE 7B

Pretreatment Leaching

This is an example of the pretreatment leaching of a material having a high weight ratio of soluble arsenic to soluble antimony. The solids are sulfidized while the arsenic and antimony are leached. Sulfur and NaOH are used as leaching agents.

In this test, solids containing 0.26% In, 42.0% Pb, 13.40% Zn, 4.20% Sb, 12.60% As, 0.92% Cd and 0.016% Ag were leached. This material had a high weight ratio of soluble arsenic to soluble antimony. For the test, 150.0 g of the above solids were leached in an agitated vessel for 5 hours at 105° C. in one liter of solution containing 100 g/L of sulfur and 275 g/L of NaOH. After leaching was complete, the remaining solids were filtered from the liquids and a mass balance was performed. The remaining solids had a low weight ratio of soluble arsenic to soluble antimony and assayed as 1.01% Sb and 0.67% As. 78.9% of the antimony and 95.4% of the arsenic were solubilized in the clarified, pregnant leach liquor. Almost 100% of the other metals including Ag, In, Cd, Pb and Zn were sulfidized but were not solubilized and remained in the solid phase. This not only makes the remaining solids more stable but also more readily processed by established metallurgical techniques such as flotation and smelting. Also, the remaining solids material could now be treated to make marketable antimony products using the processes of the present invention as depicted in FIGS. 1 and 2A-2D. The clarified, pregnant leach liquor from this leaching could also be pretreated further in the manner outlined in FIGS. 3B and 3C such as by recycling, autoclaving, or crystallizing.

EXAMPLE 7C

Effect of Thiosulfate Concentration on Pretreatment Leaching

To further illustrate the effect of thiosulfate on leaching of antimony, the following tests were run concurrently. Two separate samples each of 400 dry grams of well blended material having a high weight ratio of soluble arsenic to soluble antimony were each processed in leach tests. The material assayed as 45.10% Pb, 10.70% Zn, 0.25% In, 0.59% Sn, 5.51% Sb, 14.46% As, Ag 2.24 oz/Ton.

In the first test, 240 grams of NaOH and 160 grams of sulfur were dissolved in water to a total volume of 4 liters. This was placed in an enclosed 8 liter vessel. The solution was heated to 90° C. and agitated at 1000 rpm. To this, the 400 gram sample mentioned above was added and the slurry was heated to 105° C. Samples of the leach slurry were taken at timed intervals during the 5 hour test period. When the test was completed, the solids were filtered from the liquids and complete mass balances were performed. A solid sulfidized residue was produced containing 2.16% Sb and 0.37% As. This material contained almost all of the other metals including Pb, Zn, In and Ag, and could be further processed as shown in FIG. 1 or marketed as is. The solution contained 66.26% of the original Sb as well as 93.99% of the original As.

In the second test, 400 grams of the same material was used under substantially the same conditions with 240 grams of NaOH and 160 grams of sulfur. However, to the original leach solution 886.6 grams of hydrated sodium thiosulfate were added. This resulted in a 4 liter leach solution with 100 g/L $S_2O_3$. As before, the test ran for 5 hours, and samples of the leach slurry were taken at timed intervals. A mass balance was completed on the final solids and solutions produced. As witnessed in previous work, use of thiosulfate enhanced dissolution rates and overall amounts of antimony leached. Indeed, the final residue produced was a sulfidized solid assaying as 1.70% Sb and 0.35% As. 73.47% of the Sb was leached from the original sample as well as 96.57% of the As. In terms of Sb leaching, this represents a relative improvement of over 10% better recovery when using thiosulfate in the process.

The choice of which pretreatment process to use will depend upon the nature of the feed material. In general, if the arsenic in the material is present in a readily soluble form and the antimony is present as an insoluble compound, a pretreatment leach as depicted in FIG. 3A is used. This is generally used with alkaline or neutral conditions. Examples of readily soluble arsenic compounds are oxides and sodium arsenic compounds. Examples of insoluble antimony compounds, are antimony metal, antimony oxides, and sodium antimony compounds. Under these circumstances, the process depicted in FIG. 3A will leach the majority of the arsenic into solution leaving the majority of the antimony in the solid residue.

In the embodiment depicted in FIG. 3A, the material for pretreatment may be leached with an NaOH solution to selectively leach away most of the arsenic along with small amounts of other metals present. The pretreatment leach slurry is filtered to obtain the insoluble residue which comprises solids having a low weight ratio of soluble arsenic to soluble antimony. This insoluble residue may then be provided as feed material for the process depicted in FIG. 1. All or a portion of the clarified, pregnant leach liquor may be returned to the pretreatment leaching stage or may be sent to disposal and treated using a waste treatment stage substantially similar to that outlined in Example 8, below. Alternatively, the clarified, pregnant leach liquor may be treated with sodium hydrosulfide, sulfur, thiosulfate, or sulfide to completely precipitate ions such as Cu, Zn, and Pb and the like which may be present. The precipitated materials are then filtered leaving essentially an arsenic-containing solution.

If both arsenic and antimony are present in relatively insoluble forms, they may be leached in a single stage using the alternate processes depicted in FIGS. 3B and 3C. In the embodiment set forth in FIG. 3B, the material to be pretreated is leached using a leach liquor which may contain sodium sulfide, sodium hydrosulfide, sulfur, sodium thiosulfate, sodium carbonate, and a caustic such as sodium hydroxide (FIGS. 3B and 3C).

The total sulfur content of the pretreatment leach liquor is preferably from about 1 to 400 g/L, more preferably from about 20 to 300 g/L, and most preferably from about 100 to 200 g/L. All or none of the total sulfur in the pretreatment leach liquor may be supplied by elemental sulfur, however it is preferred that about 10% to 80% be derived from elemental sulfur, and it is more preferred that about 20% to 40% be derived from elemental sulfur. The pretreatment leach liquor preferably also has the following components in the concentrations indicated: from about 0 to 500 g/L carbonate, from about 0 to 300 g/L thiosulfate, from about 0 to 750 g/L NaOH, from about 0 to 450 g/L hydrosulfide, and from about 0 to 400 g/L sulfide. It is more preferred that the pretreatment leach liquor include from about 10 to 250 g/L carbonate, from about 10 to 200 g/L thiosulfate, from about 50 to 500 g/L NaOH, from about 10 to 350 g/L hydrosulfide, and from about 0 to 300 g/L sulfide, and it is most preferred that the pretreatment leach liquor include from about 50 to 150 g/L carbonate, from about 25 to 100 g/L thiosulfate, from about 50 to 200 g/L NaOH, from about 10 to 250 g/L hydrosulfide, and from about 10 to 200 g/L sulfide.

The material to be pretreated is added to the pretreatment leach liquor to obtain a solids content preferably of about 1 to 500 g/L, more preferably of about 20 to 400 g/L, and most preferably of about 100 to 200 g/L. The material to be pretreated has a particle size of preferably about 80% −½", more preferably about 80% −¼", and most preferably about 80% −325 mesh. The leach vessel is agitated at a rate of, preferably, from about 0 to 5000 rpm, more preferably from about 500 to 1500 rpm, and most preferably from about 800 to 1200 rpm. Those of ordinary skill in the art will recognize that the agitation rate will depend upon such factors as the configuration of the pretreatment leaching vessel chosen, the method of agitation, and the type of agitator used.

During pretreatment leaching, the temperature is preferably maintained at from about 20° to 400° C., more preferably at from about 50° to 160° C., and most preferably at from about 105° to 130° C. The reaction may take place in a batch or continuous mode in an enclosed or open vessel which is either pressurized or unpressurized. The pressure is typically the resultant vapor pressure of the pretreatment leach liquor at the temperature chosen. The pretreatment leaching is preferably performed for about 1 to 36 hours, more preferably for about 3 to 15 hours, and most preferably for about 10 to 13 hours. The desired time for pretreatment leaching will vary for many of the reasons discussed above in connection with the leaching stage depicted in FIG. 1.

After pretreatment leaching, the pretreatment leach slurry is filtered to obtain an insoluble residue which includes marketable sulfidized solids. The clarified, pregnant leach liquor is then sent to the pretreatment autoclave, for autoclaving using oxygen pressure and heat under conditions substantially similar to those discussed above in connection with the autoclaving stage of FIG. 1 and Example 4. The filtered solution from the pretreatment autoclaving stage is rich in sodium thiosulfate and free hydroxide which, as suggested above, can have a positive effect on the pretreatment leaching stage. Accordingly, all or a portion of the filtered solution from the pretreatment autoclaving stage may be returned to the pretreatment leaching stage or may be disposed of as waste material in the manner illustrated in Example 8.

EXAMPLE 8

Waste Treatment

The following illustrates the treatment of waste solutions derived from this process using a soluble iron compound.

1 liter of decrystallized autoclaved solution was filtered to remove any solids. This solution had a pH of 13.5. It contained 5.0 g/L As and 0.2 g/L Sb. Solid ferrous sulfate was added to the filtered, autoclaved, decrystallized pretreatment solution until the pH dropped to 8.0. The resultant slurry was stirred for 20 minutes to allow all of the ferrous sulfate to react. Then, solid quicklime (CaO) was added to adjust the pH to 9.0. The slurry was again agitated for 20 minutes to allow the lime to react completely. Then, the slurry was filtered to separate solids from liquids. A mass balance was performed on the resultant liquid and solid phases. Over 99.0% of both the As and Sb were precipitated as stable iron compounds. As suggested above, this waste treatment process is not limited to use on a pretreatment, autoclaved, decrystallized solution but may also be used in connection with the disposal of other materials such as those depicted in FIGS. 2B, 2D, 3A, 3B, and 3C.

The materials to be treated by the waste treatment process have preferably been autoclaved with oxygen to reduce the antimony content and to raise the valency of arsenic to its +5 state. The waste treatment may be carried out using a number of soluble iron compounds such as ferric sulfate, ferrous sulfate, ferric chloride, or ferrous chloride. The soluble iron compound is added to obtain a molar ratio of Fe to As preferably of about 0.1:1 to 100:1, more preferably of about 0.1:1 to 50:1, and most preferably about 0.1:1 to 10:1. The temperature is preferably maintained in the range of about 0° to 100° C. After the soluble iron compound has been allowed to react, enough quicklime is added to obtain a pH preferably of from about 1 to 13, more preferably of from about 2 to 12, and most preferably of from about 7 to 10.

The solids recovered from the pretreatment autoclaving stage include a relatively impure sodium hydroxy antimonate product which may then be treated according to the process depicted in FIG. 1. Using the solids recovered from the autoclaving stage as the feed material for the process of FIG. 1 allows one to obtain a relatively fast and complete separation of antimony from the feed material while also regenerating NaOH for reuse in the leaching stage. Moreover, reagents, time, and labor are saved because the antimony contained in the pretreated sodium hydroxy antimonate is already in the +5 valency state. It remains in the +5 valency state during leaching thereby making the downstream separation possible. In the above manner, the pretreatment autoclaving stage allows for separation of arsenic from antimony and therefore allows for the preparation of a feed material containing a low weight ratio of soluble arsenic to soluble antimony.

Tests were run to illustrate the benefits of using the relatively impure sodium hydroxy antimonate obtained from the pretreatment autoclaving as the antimony-containing feed material for the process of FIG. 1. The tests were run under substantially the same conditions as Example 1A, however, a 325.4 g sample of solid sodium hydroxy antimonate was leached in the baseline solution. Samples of the leach slurry were taken at timed intervals for analysis of reaction kinetics. The solution leached nearly 100% of the antimony in the +5 valency state within ten minutes. In addition, a total of 171.2 grams of NaOH was generated in the resultant pregnant leach liquor.

In another embodiment of the pretreatment process of the present invention, as depicted in FIG. 3C, a pretreatment crystallization stage is added to the process depicted in FIG. 3B. In this regard, the clarified, pregnant leach liquor from the pretreatment leach is subjected to crystallization under conditions substantially similar to those discussed above in connection with the crystallization stage of FIG. 1 and Example 2. However, because the pretreatment material has a high weight ratio of soluble arsenic to soluble antimony, the clarified, pregnant leach liquor from the pretreatment leach will also include preferably from about 1 to 300 g/L As, more preferably from about 10 to 125 g/L As, and most preferably from about 40 to 100 g/L As. The clarified, pregnant leach liquor is cooled to precipitate crystallized antimony and arsenic compounds. After crystallization, the crystallized antimony and arsenic compounds are filtered from the leach liquor. The barren leach liquor may then be reused in the pretreatment leaching stage. The filtered crystallized antimony and arsenic compounds are redissolved and the solution is again filtered. Any undissolved solids are separated and returned to the pretreatment leaching stage. The solution containing the redissolved crystallized antimony and arsenic compounds is then sent to the pretreatment autoclave and is treated in substantially the same manner as in the process depicted FIG. 3B and discussed above. The addition of the pretreatment crystallization stage allows for better recycle of decrystallized solutions and more efficient usage of the pretreatment autoclave stage.

A latitude of modification, change and substitution is intended in the foregoing disclosure and in some instances some features of the invention will be employed without a corresponding use of other features. The examples set forth above are used simply to illustrate the various stages of the process of the present invention. The process of the present invention should not be limited by the specific parameters disclosed in these examples. Accordingly, it is appropriate that the appended claims be construed broadly and in a manner consistent with the scope of the invention.

What is claimed is:

1. An antimony separation process comprising the steps of:
   providing material containing antimony;
   leaching said material with a solvent for preferentially dissolving said antimony to form a pregnant leach liquor and an insoluble residue;
   separating said leach liquor from said insoluble residue;
   treating said separated leach liquor to crystallize compounds containing antimony;
   separating said crystallized antimony compounds from said separated leach liquor;
   redissolving said crystallized antimony compounds; and
   treating said redissolved antimony compounds to form a product selected from the group consisting of antimony metal, sodium thioantimonate, sodium hydroxy antimonate, sodium antimonate, antimony pentoxide, and antimony pentasulfide.

2. The process of claim 1 wherein said leaching step converts substantially all of said antimony to its +5 valency state.

3. The process of claim 1 wherein said leaching solvent comprises sodium sulfide, sulfur, and a caustic.

4. The process of claim 3 wherein said leaching solvent further comprises sodium thiosulfate and said caustic is sodium hydroxide.

5. The process of claim 1 wherein said step of treating said redissolved antimony compounds to form a product comprises electrowinning said dissolved antimony compounds to form antimony metal.

6. The process of claim 5 wherein said electrowinning is performed in a diaphragmless cell.

7. The process of claim 6 further comprising adding a compound selected from the group consisting of sodium sulfite, sodium carbonate, or combinations thereof to said redissolved antimony compounds before electrowinning.

8. The process of claim 6 wherein said step of electrowinning to form said antimony metal generates a solution rich in sodium hydroxide; and further comprising the step of adding said solution rich in sodium hydroxide to said solvent of said leaching step.

9. The process of claim 1 wherein said step of treating said redissolved antimony compounds to form a product comprises autoclaving said dissolved antimony compounds under oxygen pressure and heat to form sodium hydroxy antimonate.

10. The process of claim 9 wherein said autoclaving to form sodium hydroxy antimonate generates a solution rich in thiosulfate; and further comprising returning said solution rich in thiosulfate to said leaching step.

11. The process of claim 9 further comprising heating said sodium hydroxy antimonate to form sodium antimonate.

12. The process of claim 9 further comprising treating said sodium hydroxy antimonate with an acid to form a hydrated antimony pentoxide.

13. The process of claim 12 wherein said acid is sulfuric acid.

14. An antimony separation process comprising:
providing a material containing antimony;
leaching said material in a solution comprising elemental sulfur and a caustic for preferentially dissolving said antimony to form a pregnant leach liquor and an insoluble residue;
separating said leach liquor from said insoluble residue;
treating said separated leach liquor to crystallize compounds containing antimony; and
separating said crystallized antimony compounds from said separated leach liquor.

15. The process of claim 14 wherein said leaching solution further comprises an alkali metal sulfide and thiosulfate.

16. An antimony separation process comprising:
providing a material containing arsenic and antimony and having a high weight ratio of soluble arsenic to soluble antimony;
treating said material to reduce the arsenic content thereof so that said treated material has a low weight ratio of soluble arsenic to soluble antimony;
leaching said treated material with a solvent for preferentially dissolving said antimony to form a pregnant leach liquor and an insoluble residue;
separating said antimony-containing leach liquor from said insoluble residue;
treating said separated antimony-containing leach liquor to crystallize compounds containing antimony;
separating said crystallized antimony compounds from said separated leach liquor;
redissolving said crystallized antimony compounds; and
treating said redissolved antimony compounds to form a product selected from the group consisting of antimony metal, sodium thioantimonate, sodium hydroxy antimonate, sodium antimonate, antimony pentoxide, and antimony pentasulfide.

17. The process of claim 16 wherein said high weight ratio of soluble arsenic to soluble antimony is approximately greater than 0.8 and said low weight ratio of soluble arsenic to soluble antimony is approximately less than or equal to 0.8.

18. The process of claim 16 wherein said step of treating said material comprises:
leaching said material with a solvent for preferentially dissolving said arsenic to form a pregnant leach liquor containing arsenic and an insoluble residue; and separating said arsenic-containing leach liquor from said insoluble residue, leaving said insoluble residue with a low weight ratio of soluble arsenic to soluble antimony.

19. The process of claim 18 wherein said solvent for preferentially dissolving said arsenic consists essentially of a solution selected from the group consisting of sodium hydroxide and water or sodium carbonate and water.

20. The process of claim 16 wherein said step of treating said material comprises:
leaching said material with a solvent for preferentially dissolving said arsenic and said antimony to form a pregnant leach liquor containing arsenic and antimony and an insoluble residue;
separating said arsenic- and antimony-containing leach liquor from said insoluble residue;
autoclaving said arsenic- and antimony-containing leach liquor under oxygen pressure and heat to form a slurry comprising a solution rich in arsenic-containing compounds and a solid rich in sodium hydroxy antimonate;
separating said solution rich in arsenic-containing compounds from said slurry to leave said solid rich in sodium hydroxy antimonate and having a low weight ratio of soluble arsenic to soluble antimony.

21. The process of claim 20 further comprising treating said separated solution rich in arsenic-containing compounds with a soluble iron compound and lime for safe waste disposal.

22. The process of claim 16 wherein said step of treating said material comprises:
leaching said material with a solvent for preferentially dissolving said arsenic and said antimony to form a pregnant leach liquor containing arsenic and antimony and an insoluble residue;
separating said arsenic- and antimony-containing leach liquor from said insoluble residue;
treating said separated arsenic- and antimony-containing leach liquor to crystallize compounds containing said arsenic or said antimony or combinations thereof;
separating said crystals of said arsenic and said antimony and said combinations thereof from said separated arsenic- and antimony-containing leach liquor;
redissolving said crystals of said arsenic and said antimony and said combinations thereof;
autoclaving said redissolved crystals of said arsenic and said antimony and said combinations thereof under oxygen pressure and heat to form a slurry comprising a solution rich in arsenic-containing compounds and a solid rich in sodium hydroxy antimonate;
separating said solution rich in arsenic-containing compounds from said slurry to leave said solid rich in sodium hydroxy antimonate and having a low weight ratio of soluble arsenic to soluble antimony.

* * * * *

UNITED STATES PATENT AND TRADEMARK OFFICE
CERTIFICATE OF CORRECTION

PATENT NO. : 5,290,338
DATED : March 1, 1994
INVENTOR(S) : Corby G. Anderson et al.

It is certified that error appears in the above-identified patent and that said Letters Patent is hereby corrected as shown below:

Column 8, line 41, change "201°" to -- 20° --.

Column 11, the equation after line 17, change "(where x=5)" to -- (where x=2 to 5) --.

Column 16, line 23, change "0 to 1000" (second occurrence) to -- 400 to 1000 --.

Signed and Sealed this

Twelfth Day of July, 1994

Attest:

BRUCE LEHMAN

*Attesting Officer*  *Commissioner of Patents and Trademarks*